United States Patent
Oyman

(10) Patent No.: US 9,860,290 B2
(45) Date of Patent: Jan. 2, 2018

(54) SYSTEM AND METHOD FOR ADAPTING VIDEO COMMUNICATIONS

(75) Inventor: Ozgur Oyman, Palo Alto, CA (US)

(73) Assignee: INTEL CORPORATION, Santa Clara, CA (US)

(*) Notice: Subject to any disclaimer, the term of this patent is extended or adjusted under 35 U.S.C. 154(b) by 935 days.

(21) Appl. No.: 13/976,445

(22) PCT Filed: Dec. 27, 2011

(86) PCT No.: PCT/US2011/067416
§ 371 (c)(1),
(2), (4) Date: Jun. 26, 2013

(87) PCT Pub. No.: WO2013/019267
PCT Pub. Date: Feb. 7, 2013

(65) Prior Publication Data
US 2013/0275615 A1    Oct. 17, 2013

Related U.S. Application Data

(60) Provisional application No. 61/514,009, filed on Aug. 1, 2011.

(51) Int. Cl.
*G06F 15/16* (2006.01)
*H04L 29/06* (2006.01)
(Continued)

(52) U.S. Cl.
CPC .......... *H04L 65/60* (2013.01); *H04L 63/0815* (2013.01); *H04L 63/0884* (2013.01);
(Continued)

(58) Field of Classification Search
CPC . H04L 65/607; H04L 65/80; H04N 21/25833; H04N 21/2662
See application file for complete search history.

(56) References Cited

U.S. PATENT DOCUMENTS 7,339,493 B2    3/2008   El Zabadani et al.
9,136,983 B2 *  9/2015   Watson ................. H04L 1/0041
(Continued)

FOREIGN PATENT DOCUMENTS

EP     2199902 A1     6/2010
JP     2006309502     3/2006
(Continued)

OTHER PUBLICATIONS

Office Action received for Korean Patent Application No. 2014-7005114, mailed Jul. 28, 2015, 15 pages including 6 pages English translation.
(Continued)

*Primary Examiner* — Richard G Keehn

(57) ABSTRACT

An apparatus may include one or more radio-frequency (RF) transceivers arranged to receive multimedia content during a session over a first link from a wireless wide-area network (WWAN) and to forward information over a second link to a display device. The apparatus may further include a processor circuit communicatively coupled to the one or more RF transceivers and a video adaptation module operative on the processor circuit to gather device capability information from the display device, and to modify device capability exchange signaling to the WWAN based upon the gathered device capability information, the device capability exchange signaling to define exchange of multimedia content between the apparatus and the WWAN. Other embodiments are disclosed and claimed.

27 Claims, 14 Drawing Sheets

(51) Int. Cl.
H04N 21/258 (2011.01)
H04N 21/2662 (2011.01)
H04L 29/08 (2006.01)

(52) U.S. Cl.
CPC ........ *H04L 65/1069* (2013.01); *H04L 65/601* (2013.01); *H04L 65/607* (2013.01); *H04L 67/148* (2013.01); *H04L 67/303* (2013.01); *H04N 21/25833* (2013.01); *H04N 21/2662* (2013.01); *H04L 63/102* (2013.01); *H04L 65/80* (2013.01)

(56) References Cited

U.S. PATENT DOCUMENTS

| | | | |
|---|---|---|---|
| 9,288,010 B2* | 3/2016 | Luby | H04L 1/0056 |
| 2002/0102998 A1 | 8/2002 | Lin | |
| 2003/0068041 A1* | 4/2003 | Wee | H04N 7/167 380/200 |
| 2003/0070081 A1* | 4/2003 | Wee | H04L 63/04 713/189 |
| 2003/0161401 A1* | 8/2003 | Shen | G06T 3/4084 375/240.16 |
| 2004/0057420 A1 | 3/2004 | Curcio et al. | |
| 2005/0002337 A1* | 1/2005 | Wang | H04L 1/0009 370/235 |
| 2005/0188056 A1 | 8/2005 | Kangas et al. | |
| 2006/0206617 A1 | 9/2006 | Rey et al. | |
| 2006/0217065 A1 | 9/2006 | Spilo et al. | |
| 2007/0011256 A1 | 1/2007 | Klein | |
| 2007/0177491 A1 | 8/2007 | Honda et al. | |
| 2007/0220562 A1 | 9/2007 | Janssen et al. | |
| 2007/0266122 A1 | 11/2007 | Einarsson et al. | |
| 2008/0089307 A1 | 4/2008 | Tuijn et al. | |
| 2008/0228912 A1 | 9/2008 | Ramakrishna et al. | |
| 2008/0281971 A1 | 11/2008 | Leppanen et al. | |
| 2009/0052380 A1 | 2/2009 | Espelien | |
| 2009/0083426 A1 | 3/2009 | Cagenius | |
| 2009/0100262 A1* | 4/2009 | Yoo | H04L 63/08 713/155 |
| 2010/0095332 A1 | 4/2010 | Gran et al. | |
| 2011/0019620 A1* | 1/2011 | Wang | H04L 49/109 370/328 |
| 2011/0173331 A1 | 7/2011 | Setton et al. | |
| 2011/0307581 A1* | 12/2011 | Furbeck | H04L 65/1083 709/219 |
| 2012/0023254 A1* | 1/2012 | Park | H04L 65/4084 709/231 |
| 2012/0206645 A1* | 8/2012 | Ozawa | H04N 7/17318 348/425.3 |
| 2012/0278495 A1* | 11/2012 | Furbeck | H04N 21/6131 709/231 |
| 2012/0290644 A1 | 11/2012 | Gabin et al. | |

FOREIGN PATENT DOCUMENTS

| | | |
|---|---|---|
| JP | 2006-309522 | 11/2006 |
| JP | 2007281754 | 10/2007 |
| JP | 2008282296 | 11/2008 |
| WO | 2004029829 A1 | 4/2004 |
| WO | 2009010632 | 1/2009 |
| WO | 2009039637 A1 | 4/2009 |
| WO | 2010128962 | 11/2010 |

OTHER PUBLICATIONS

Office Action received for Korean Patent Application No. 2014-7005114, mailed Jan. 16, 2015, 12 pages including 6 pages English translation.

Office Action received for Japanese Patent Application No. 2014-523911, mailed Feb. 3, 2015, 7 pages including 4 pages English translation.

Extended European Search Report received for European Patent Application No. 11870495.6, mailed Mar. 2, 2015, 10 pages.

Menu et al., "Session Mobility Between Heterogeneous Accesses with the Existence of IMS as the Service Control Overlay", 10th IEEE Singapore International Conference on, IEEE, PI, Oct. 2006, 5 pages.

"3rd Generation Partnership Project; Technical Specification Group Services and System Aspects; IP Multimedia Subsystem (IMS) service continuity enhancements; Service, policy and interaction; Stage 2 (Release 9)", 3GPP TR 23.838 V9.0.0 (Jun. 2009), 51 pages, (Author unknown).

Extended European Search Report received for European Patent Application No. 15189647.9, mailed Jan. 14, 2016, 13 pages.

"3rd Generation Partnership Project; Technical Specifications Group Services and System Aspects; Transparent end-to-end packet-switched streaming service (PSS); General description (Release 10)", 3GPP TS 26.233, V10.1.0 (Jun. 2011), 16 pages.

International Search Report and Written Opinion, Mailed Date: Sep. 3, 2012, Application No. PCT/US2011/067416, Filed Date: Dec. 27, 2011, pp. 7.

Office Action received for Russian Patent Application No. 2014107658, mailed Nov. 5, 2014, 7 pages including 3 pages English translation.

Gabin F. et al, 3GPP Mobile Multimedia Streaming Standards [Standards in a Nutshell], IEEE Signal Processing Magazine, IEEE Service Center, vol. 27, No. 6, Nov. 1, 2010.

Technical Specification Universal Mobile Telecommunications System (UMTS); LTE; Transparent end-to-end Packet-switched Streaming Service (PSS); Progressive Download and Dynamic Adaptive Streaming over HTTP (3GP-DASH), 3GPP TS 26.247, v. 10.0.0 Release 10, Sophia Antipolis Cedex, Jun. 2011, pp. 1-33.

Technical Specification Universal Mobile Telecommunications System (UMTS); LTE; Transparent end-to-end Packet-switched Streaming Service (PSS); Progressive Download and Dynamic Adaptive Streaming over HTTP (3GP-DASH), 3GPP TS 26.247, v. 10.0.0 Release 10, Sophia Antipolis Cedex, Jun. 2011, pp. 34-66.

Technical Specification Universal Mobile Telecommunications System (UMTS); LTE; Transparent end-to-end Packet-switched Streaming Service (PSS); Progressive Download and Dynamic Adaptive Streaming over HTTP (3GP-DASH), 3GPP TS 26.247, v. 10.0.0 Release 10, Sophia Antipolis Cedex, Jun. 2011, pp. 67-96.

Office Action received for Japanese Patent Application No. 2015-094157, mailed Jul. 26, 2016, 6 pages including 3 pages English translation.

Office Action received for European Patent Application No. 11870495.6, mailed Sep. 27, 2016, 8 pages.

* cited by examiner

SYSTEM AND METHOD FOR ADAPTING VIDEO COMMUNICATIONS

RELATED APPLICATION

This application claims priority to U.S. provisional patent application No. 61/514,009, filed Aug. 1, 2011 and incorporated by reference herein in its entirety.

BACKGROUND

In the present era, wireless networks are poised on the verge of a third phase of growth to supersede the current era, which is dominated by growth in data traffic, and the previous era, which was dominated by voice traffic. In the third phase of growth, video is predicted to become the dominant component of wireless traffic. In one recent study, video is predicted to exceed ninety one percent of global consumer traffic and equal about sixty six percent of total world mobile data traffic by 2014.

The growth of video services, including streaming and conversational services, is thus one of the key drivers of the evolution to new mobile broadband technologies and standards. With such high consumer demand for video services coupled with developments in media compression and wireless network infrastructures, it is of interest to enhance the video service capabilities of future cellular and mobile broadband systems and deliver high quality of experience (QoE) to the consumers, ensuring ubiquitous access to video content and services from any location, at any time, using any device and technology. In particular, mobile terminals connected wirelessly to a wide area network may also locally serve as a client hotspot for video applications delivered over digital wireline or wireless connections to peripheral display devices (e.g., TV, monitor, etc.). It may therefore be desirable to improve delivery of video content with high QoE to peripheral devices.

It is with respect to these and other considerations that the present improvements have been needed.

DETAILED DESCRIPTION

Figure 1:
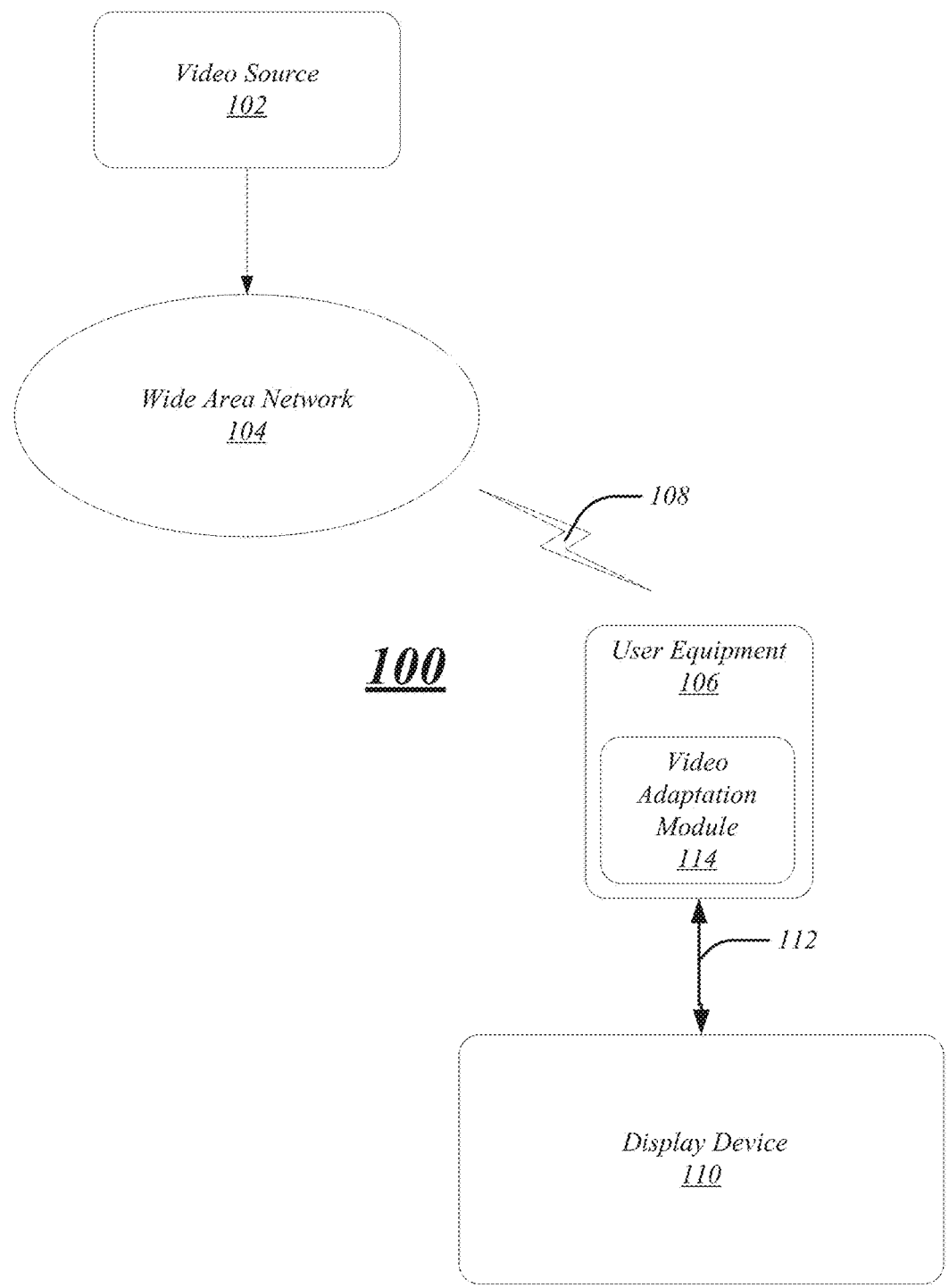
FIG. 1 depicts a system consistent with the present embodiments.

Various embodiments are related to enhancement of video in heterogeneous environments where video may be delivered to and from a user device (also termed user equipment) locally connected to peripheral display devices over possibly different air interfaces. Embodiments enhance the ability to deliver video content with high QoE in a ubiquitous fashion to peripheral display devices, and in particular provide media handling procedures and session management protocols optimized for various display device classes and capabilities.

Some embodiments may involve video adaptation and quality of experience (QoE) control for conversational and streaming services. In some embodiments, video may be provided to a display device via a link, such as a local wireless link, from a user device that is coupled over a second wireless link that receives the video from a wide area network. In some embodiments, the user device may employ a wireless technology, such as wireless display (WiDi) or other technology that employs peer-to-peer (P2P) wireless connectivity to link to the display device. This wireless connection may take place over a wireless local area network (WLAN)-based or wireless personal area network (WPAN)-based air interface including WiFi P2P, WFA WiFiDisplay, WiDiDirect, myWiFi, 60 GHztechnology, Bluetooth, wireless USB, and other known technologies.

Some embodiments of a communications system may be implemented with a radio technology such as the Institute of Electrical and Electronics Engineering (IEEE) 802.16 (Wi-MAX), IEEE 802.11 (WiFi), IEEE 802-20, the 3rd Generation Partnership Project (3GPP) Evolved Universal Mobile Telecommunication System (UMTS) Terrestrial Radio Access (UTRA) (E-UTRA), among others. IEEE 802.16m is an evolution of IEEE 802.16e, and provides backward compatibility with an IEEE 802.16-based system. The UTRA is a part of UMTS. The 3GPP long term evolution (LTE) is a part of an evolved UMTS (E-UMTS) using the E-UTRA. LTE-advance (LTE-A) is an evolution of the 3GPP LTE. As used herein, any reference to the term "LTE" includes any version of LTE, including LTE-A and its revisions, progeny, and variants. The embodiments are not limited in this context. Embodiments may also be implemented using Bluetooth®, or other wireless local radio communication standards.

In various embodiments, the display device may be used to present visual content, such as video that is transmitted from a user device that receives the video from an external source. In particular embodiments, the user device and display device may communicate control information between each other to control and adapt video communications, thereby enhancing conversational video sessions or streaming video sessions. In some embodiments, an apparatus may include one or more radio-frequency (RF) transceivers arranged to receive multimedia content during a session over a first link from a wireless wide-area network (WWAN), and forward information over a second link to a display device, the first and second links comprising heterogeneous links. The apparatus may also contain a processor circuit communicatively coupled to the one or more RF transceivers and a video adaptation module. The video adaptation module may be operative on a processor circuit to gather device capability information from the display device, and modify device capability exchange signaling to the WWAN based upon the gathered device capability information from the display device, the device capability exchange signaling to define exchange of multimedia content over the first link, the second link, or both the first and second links. Other embodiments are described and claimed.

FIG. 1 depicts a system 100 consistent with the present embodiments. In some embodiments, the system 100 may enhance the provision of video content for conversational and streaming services where video is provided as all or part of the service. As depicted, a video source 102 is linked to a wireless wide area network 104, which in turn, is coupled to a user equipment (UE) 106 over a wireless link 108. In various embodiments, the wireless wide area network 104 may be a non-local network, which generally refers to a network that may include a public radio access network component with a radio technology such as IEEE 802.16 (WiMAX), 3GPP, or IEEE 802.11 (WiFi), for example. In this regard, as used herein, the term "WWAN" may refer to the combination of a radio access network and a core network such as a WiMAX or 3GPP network, and may also include wireless local area networks such as a public WiFi network. The non-local network may also include an IP network and other core network components that, together with the radio access network, may link a video source to UE. In this regard, a wireless link from a UE to a public land mobile network, and in particular, a wireless link to a WWAN, is referred to herein as a "non-local" link.

Examples of video source 102 may include any hardware or software element capable of storing and/or delivering video content, such as a digital video recorder (DVR), a computer, a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a gaming console, a compact disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, smart phones, tablets, notebooks, handheld computers, wearable computers, portable media players (PMP), portable media recorders (PMR), digital audio devices (e.g., MP3 players), digital media servers and so forth. Other examples of video source 102 may include media distribution systems to provide broadcast or streaming analog or digital AV signals to UE 106. The embodiments are not limited in this context.

In various embodiments, the UE 106 may include a display (not shown) for presenting visual information such as video content received from the video source 102. Examples of UE 106 may include without limitation mobile computing devices, laptop computers, desktop computers, handheld computing devices, tablet computing devices, netbook computing devices, smart phones, cellular telephones, wearable computers, and so forth. The embodiments are not limited in this context.

Consistent with the present embodiments, the UE 106 may be linked to a display device 110 over a link 112. In various embodiments the display device 110 may be a digital display, a television display, a mobile computing device, a laptop computer, a desktop computer, a handheld computing device, tablet computing device, netbook computing device, smart phone, and so forth. The embodiments are not limited in this context.

In some embodiments, the link 112 may be a local wireless link that forms a P2P connection as described above. The UE 106 may be operable to forward video content received from video source 102 for presentation on the display device 110. This may be desirable in cases where the display device 110 enhances the quality of presentation of video content received from video source 102. In various embodiments of a link 112 that forms a local link between the UE 106 and display device 110, a user may be located near one or both of UE 106 and display device 110. In this manner, the user may manage operation of the UE 106 for receiving video content, such as in a video internet telephone call or in a video streaming session. At the same time, the user may view video received from video source 102 as presented on the display device 110, which is located proximate the user.

In various embodiments, the UE 106 includes a video adaptation module 114 that is arranged to improve handling of a video communications session established between the UE 106 and the video source 102 and display device 110. In particular, the video adaption module 114 may improve such features as media adaptation, transport signaling, capability negotiation, buffer management, and QoE measurement and reporting during a communications session. Examples of operations implemented by a video adaptation module are described below with reference to the FIGS. 4-6 and 8-12.

Figure 2:
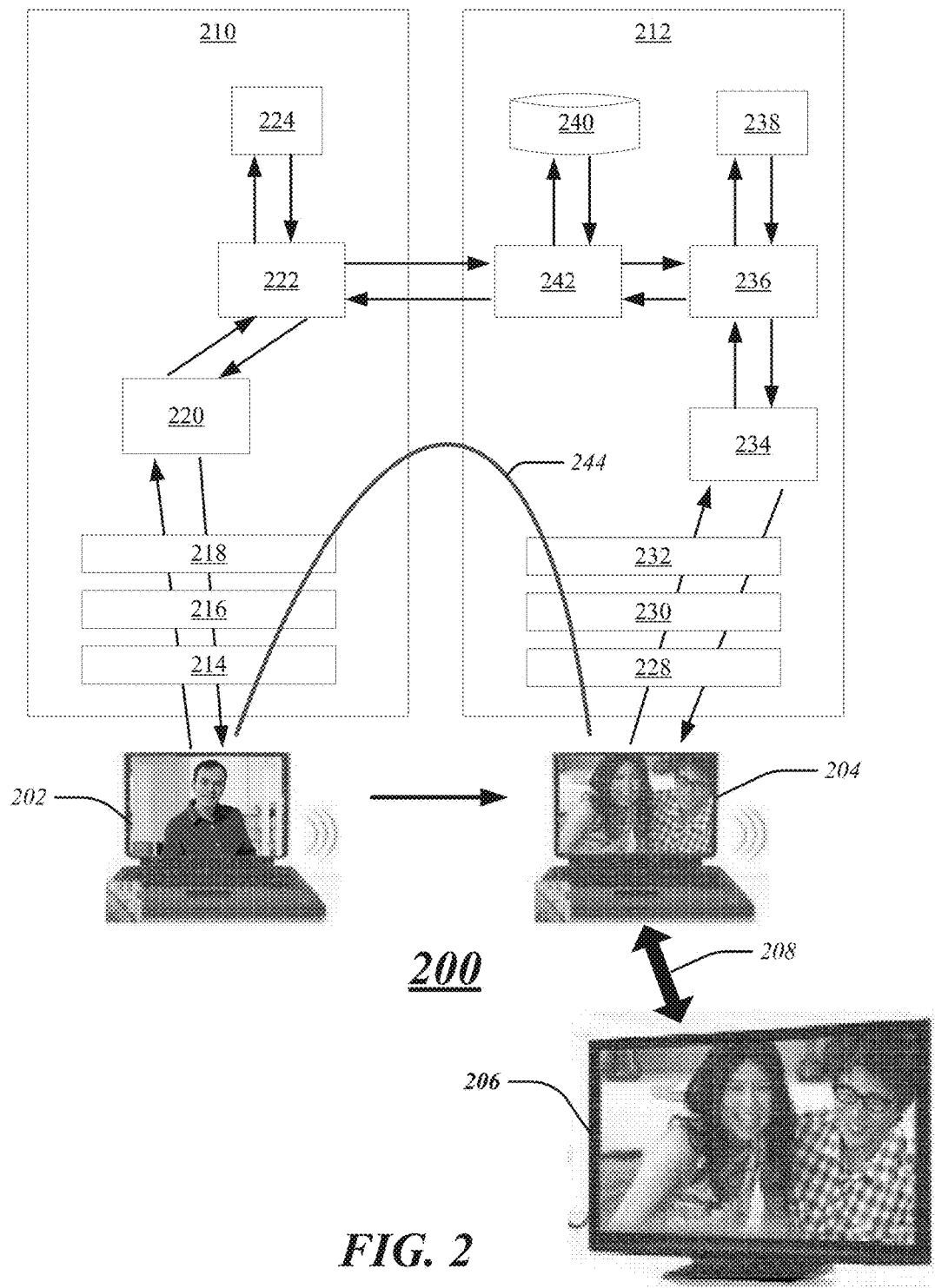
FIG. 2 depicts an embodiment of a system that may provide video conferencing functionality.

FIG. 2 depicts an embodiment of a system 200 that may provide video conferencing functionality between a caller device 202 and a UE 204. In the embodiment illustrated, both the caller device 202 may initiate a communications session, such as a videoconferencing session carried using an internet protocol (IP) based link. In one example a caller using caller device 202 may place an internet phone call to a user located at UE 204 using a known video communications application (e.g., Skype™). Video transmitted to UE 204 may also be presented on display device 206, which is coupled to the UE 204 over a wireless link 208. In various embodiments, the video communications session between caller device 202 and UE 204 may be hosted over an IP multimedia subsystem (IMS)-based network, such as a 3GPP network based on the multimedia telephony service over IMS (MTSI). In the particular embodiment depicted in FIG. 2, a caller using caller device 202 may employ an operator 210, while the user of UE 204 employs an operator 212.

The operator 210 may include a radio access network (RAN) 214 such as a 3GPP network or a WiMAX network. The RAN 214 may be linked to a conventional serving general packet radio service support node (SSGN) 216 that is arranged to deliver data packets from and to wireless devices within its geographical service area. The operator 210 further includes a gateway general packet radio service support node (GGSN) 218 linked to the SSGN 216. As illustrated, the operator 210 may also include a conventional proxy call session control function (P-CSCF) 220, serving call session control function (S-CSCF) 222 and application server (AS) 224.

The operator 212 may likewise include an RAN 228 such as a 3GPP network or a WiMax network. The RAN 228 may be linked to SSGN 230, and therethrough to GGSN 232. As illustrated, the operator 212 may also include a conventional P-CSCF 234, S-CSCF 236, and AS 238. The operator 212 may also include a home subscriber server 240 and an interrogating CSCF (I-CSCF) 242.

As illustrated in FIG. 2, when a call is initiated at the caller device 202, control signals may follow a signal path that leads from caller device 202 to UE 204 over a link through RAN 214, SGSN 216, GGSN 218, P-CSCF 220, S-CSCF 222, I-CSCF 242, S-CSCF 236, P-CSCF 234, GGSN 232, SGSN 230, and RAN 228. A media path 244 for transmitting video and other media between calling device 202 and UE 204 may flow through RAN 214, SGSN 216, GGSN 218, GGSN 232, SGSN 230, and RAN 228, as also shown in FIG. 2.

In some embodiments, the display device 206 may be linked to the UE 204 in a WLAN, WPAN, or other wireless network that is operable to transmit signals such as video and control signals over link 208. When display device 206 is powered on, video content transmitted from calling device 202 to UE 204 may be forwarded for presentation on display device 206, as shown. Consistent with various embodiments, the UE 204 may include a video adaptation module, such as video adaptation module 114 (see FIG. 1), to improve media adaptation, transport signaling, capability negotiation, buffer management, and QoE measurement and/or reporting during the video communications session between calling device 202 and UE 204.

Figure 3:
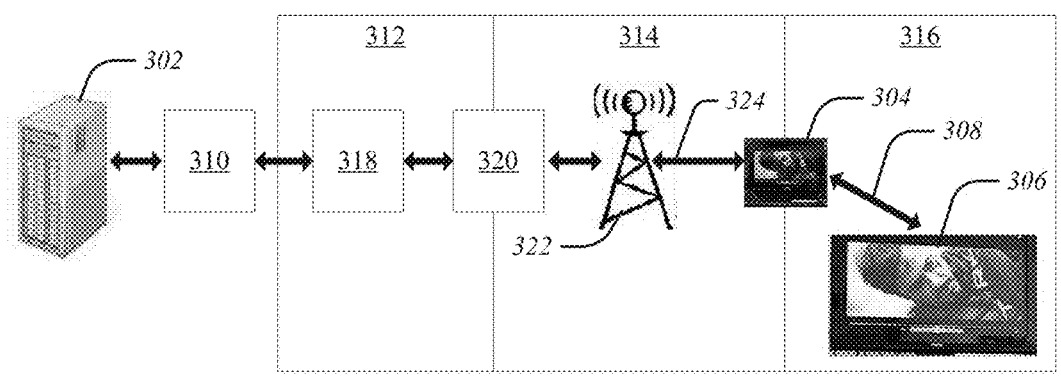
FIG. 3 depicts a system for video streaming consistent with further embodiments.

FIG. 3 depicts a system 300 for video streaming between a video source 302 and UE 304, consistent with further embodiments. The video source may be a server that provides a packet-switched streaming service (PSS) that can be accessed on demand by the UE 304. The video source 302 may provide multimedia content including video content that may be output to a user at the UE 304, and/or may be transmitted to a display device 306 over a link 308, which may be a local P2P link in some embodiments. In the embodiment depicted, the video source 302 is coupled to a public network 310, which may form part of the internet. The public network 310 is coupled to an IP network 312, which, in turn is coupled to a wireless network 314 that is wirelessly linked to the UE 304. The IP network 312 and wireless network 314 may be arranged as 3GPP networks in some embodiments. When the user initiates a video streaming session, multimedia content is provided from video source 302 to UE 304 via a path through public network 310, core network 318 of IP network 312, access network 320, and base station 322 of wireless network 314. In various embodiments, the packet video may be provided as on-demand packet-switched streaming based on real time streaming protocol (RTSP), or may be provided as hypertext transfer protocol (HTTP)-based streaming, including progressive download and dynamic adaptive streaming over HTTP (DASH).

In some embodiments, the display device 306 may be linked to the UE 304 in a WLAN, WPAN, or other wireless network (shown as network 316) that is operable to transmit signals such as video and control signals over link 308. When display device 306 is powered on, video content transmitted from video source 302 to UE 304 may be forwarded for presentation on display device 306, as shown. As in the case of the embodiments of FIG. 2, the UE 304 may also include a video adaptation module, such as video adaptation module 114 (see FIG. 1), to improve media adaptation, transport signaling, capability negotiation, buffer management, and QoE measurement and/or reporting during the video streaming sessions between video source 302 and UE 304.

Turning again to FIG. 2, in various embodiments, the operator networks 210, 212 may each operate as a multimedia telephony service for an IP multimedia subsystem (MTSI). An IP multimedia subsystem (IMS) is an architecture for implementing IP-based telephony and multimedia services. The general specifications for MTSI architecture are set forth in the document 3GPP TS 26.114 V11.1.0 (3rd Generation Partnership Project; Technical Specification Group Services and System Aspects; IP Multimedia Subsystem (IMS); Multimedia Telephony; Media handling and interaction; Release 11, September 2011) (hereinafter "TS 26.114"). The general specifications for the PSS architecture are set forth in the document 3GPP TS 26.234 V10.2.0 (3rd Generation Partnership Project; Technical Specification Group Services and System Aspects; Transparent end-to-end packet switched streaming service (PSS); Protocols and codecs; Release 10, September 2011) (hereinafter "TS 26.234"). The general specifications for the progressive download and DASH protocols are set forth in the document 3GPP TS 26.247 V10.0.0 (3rd Generation Partnership Project; Technical Specification Group Services and System Aspects; Transparent end-to-end packet switched streaming service (PSS); Progressive download and dynamic adaptive streaming over HTTP (3GP-DASH); Release 10, June 2011) (hereinafter "TS 26.247").

Notably, MTSI and PSS technologies defined in 3GPP standards require functionality that is not yet defined to deliver high video quality for conversational and steaming services over networks in which a UE has local, and possibly heterogeneous, connections to peripheral display devices, such as the multiple links to UEs 204 and 304 depicted in respective FIGS. 2 and 3. The term "heterogeneous" as used herein with respect to wireless links, connections or connectivity associated with a UE, refers to the circumstance in which a given UE is arranged to exchange data to and from the given UE over multiple wireless links, where the first wireless link employs a different technology or standard from the second wireless link, and/or operates as part of a different wireless network as compared to the wireless network of the second wireless link. Unless otherwise noted, the local links described herein with respect to the present embodiments may be heterogeneous links.

In some embodiments conversational video applications may be enhanced by using local UE connectivity information as part of the session initiation protocol (SIP) as the application-layer control protocol in order to establish, modify, and/or terminate conversational multimedia sessions, such as videoconferences, internet telephony calls, and the like.

Figure 4:
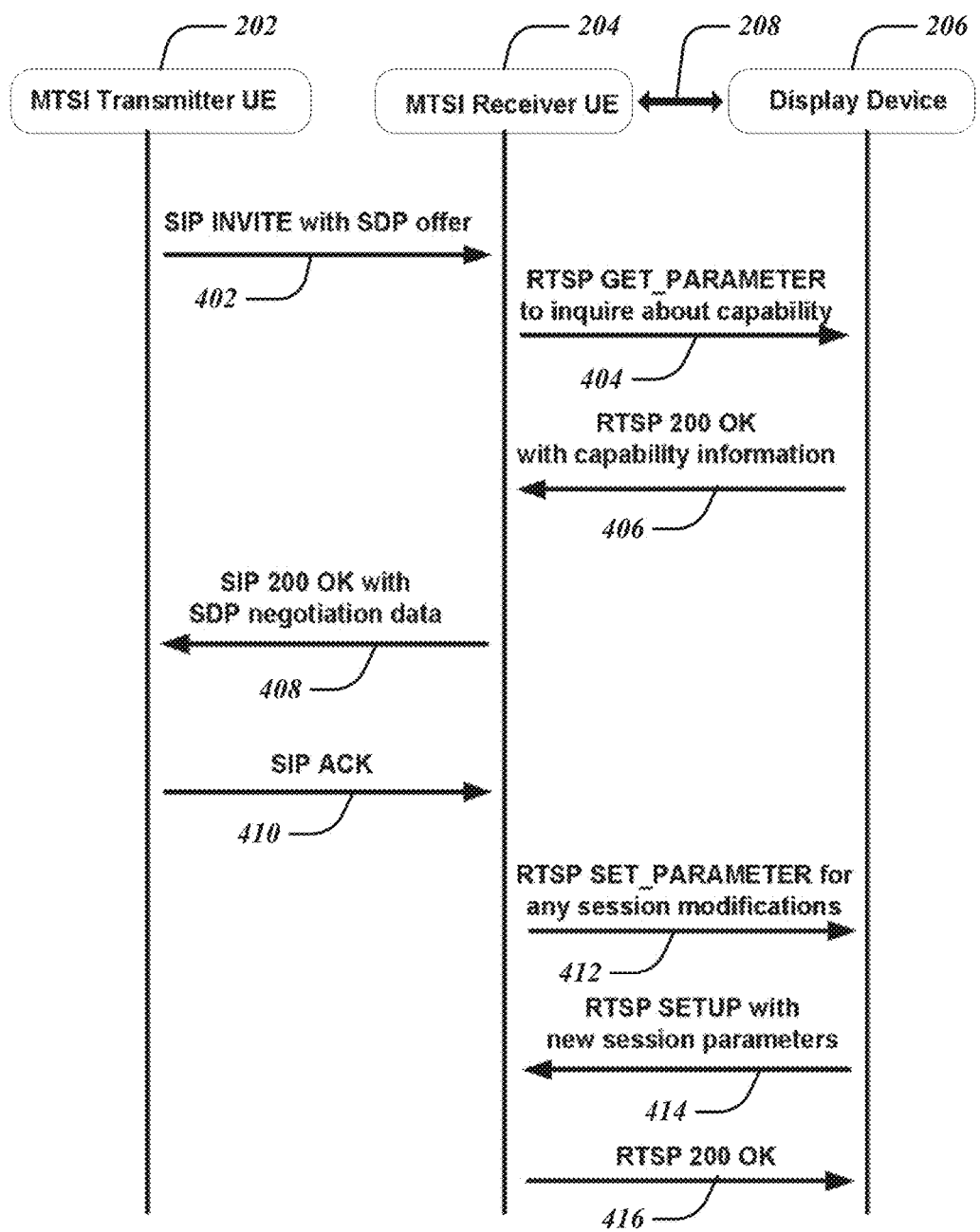
FIG. 4 depicts one embodiment of device capability signaling and session parameter negotiation operations of a mobile terminal or user equipment (UE) in a multimedia-telephony-service-over-IP Multimedia Subsystem (MTSI) system.

FIG. 4 depicts one embodiment of operations of a UE in an MTSI system that may take place in the context of conversational video services where video content is provided to and from the UE using local wireless links. Following the example of FIG. 2, a first MTSI UE may correspond to the calling device 202 and acts as a transmitter of signals to a second MTSI UE, which may correspond to the UE 204 of FIG. 2. In the scenario depicted in FIG. 4, connectivity information of the UE 204, including local connectivity information is used as part of a session initiation protocol (SIP). The SIP is an IETF-defined signaling protocol that is widely used for controlling communications sessions including voice and video calls over IP. In particular, FIG. 4 depicts an exemplary process for exchange of information by the UE 204 during capability negotiations for MTSI services via a session description protocol (SDP). The general SDP format was established by the IETF for describing streaming media initialization parameters. SDP may be used for describing multimedia communications sessions for the purposes of session announcement, session invitation, and parameter negotiation. SDP does not deliver media itself but is used for negotiation between end points of media type, format, and all associated properties. The set of properties and parameters are often called a session profile. SDP is designed to be extensible to support new media types and formats.

As depicted in FIG. 4, the calling party 202 may initiate an IP-based call, which causes an SIP message 402 to be sent to UE 204. The SIP message includes an SDP offer, which is received by UE 204. The SIP message 402 acts as a trigger message, which may cause the UE 204 to perform one or more actions. In the example of FIG. 2, the UE 204 may determine that it (UE 204) is connected over a local link a device display device 206, with which UE 204 may desire to forward media content, such as video, received during the call from the calling party 202. The receipt of the SIP message 402 may trigger the UE 204 to exchange information with any terminals (devices), including display device 206, that the UE 204 is locally coupled to in order to optimally manage video communications, for example, during the call from calling party 202. This may take place with the aid of a video adaptation module 114 that is arranged to perform various tasks discussed below with respect to FIGS. 4-12.

As an initial step, after receiving a trigger message, the UE 204 may transmit a retrieve message, which may be an RTSP GET_PARAMETER message, a message requesting device capability information, or other message to be sent to a display device coupled to the UE 204 over a local link. In some embodiments, a UE, such as UE 204, may gather information such as the link characteristics of a local P2P link, using, for example, RTSP signaling. In the particular example shown in FIG. 4, the UE 204 is triggered to send an RTSP GET_PARAMETER message 404 to display device 206, which may include a request for information regarding the device capabilities of the display device 206.

After receipt of the RTSP GET_PARAMETER message 404 the display device 206 may return an RTSP 200 OK message 406 to UE 204. The RTSP 200_OK message 406 may include information regarding device capabilities of display device 206. For example, in the case where the display device 206 is a television device, the RTSP 200_OK message 406 may include information regarding the TV screen capabilities, e.g., screen size, resolution, bit depth, etc. Device capability information from the display device may also include but not limited to: pre-decoder buffer size, initial buffering period, decoder capability, display properties (screen size, resolution, bit depth, etc.), streaming method (RTSP, HTTP, etc.), adaptation support information, quality of experience (QoE) support information, extended real time transport control protocol (RTCP) reporting support, fast content switching support, supported real-time transport protocol (RTP) profile information, and session description protocol (SDP) attributes.

Once the UE 204 has received the RTSP 200_OK message 406 from display device 206, the UE 204 may return an SIP OK message 408 to the calling device 202. The SIP OK 200 message 406 may include SDP negotiation data containing information related to a set of properties and parameters (session profile) to be employed in the communications between calling device 202 and UE 204. Consistent with the present embodiments, the SDP negotiation data may therefore include information related to the device capabilities of display device 206. In this manner, the calling device 202 and operators (210, 212) supporting the call may be apprised of the capabilities of a device (display device 206) that may receive video content from the calling device 202 and is linked to the UE 204, but not directly linked to the calling device 202.

Once the SIP OK message 408 is received by the calling device 202, a SIP ACK message 410 may be returned to the UE 204. The SIP ACK message 410 may signal the UE 204 that the calling device 202 and/or operators 210, 212 are apprised of the capabilities of the display device 206. The SIP ACK message 410 and may include adjusted communication parameters that are modified based upon the information received in the SIP OK message 408, in order to optimize exchange of video content between the various devices (202, 204, 206) that may present and/or generate video content.

Consistent with the present embodiments, as part of an SIP/SDP-based session management for MTSI, further information may be exchanged among devices linked to UE 204, regarding such entities as codecs, container formats, decoder capabilities, QoS parameters (e.g., guaranteed bitrate), capabilities of the display device (e.g., screen size, resolution, etc.) and transport protocols, which may take into account characteristics of the link between a UE and display located proximate the UE. Such a local link may be a local P2P link (see link 208 of FIG. 4), and may include link characteristics such as channel quality, capacity, throughput, and the like.

In various embodiments, in addition to gathering information such as the link characteristics of a local P2P link, a UE, such as UE 204, may further manage communications during a video streaming session, such as during an IP telephone call. In some embodiments, the UE may employ a video adaptation module 114 to manage various aspects of the video streaming session. For example, the UE may modify session parameters during the video streaming session, including deriving new RTSP/SDP session parameters. In some embodiments, the UE may perform further tasks including prioritizing traffic, allocating resources and optimizing bandwidth/QoS for a local P2P link or set of links. Referring again to FIG. 2, the further tasks may be set or modified by taking into account multimedia information gathered from session-level signaling over an operator network, such as a network of operator 210, 212, which may include a 3GPP network in some embodiments. The multimedia information used to modify or set the further tasks performed over the local P2P link may include, for example, codec information, quality requirements, and rate-distortion characteristics.

FIG. 4 also depicts an embodiment in which local P2P tasks may be modified based upon the updated information received in the SIP ACK message 410 returned to UE 204 from calling device 202. After receipt of the SIP ACK message 410, the UE may generate an RTSP SET_PARAMETER MESSAGE 412, which is forwarded over a local link to the display device 206. In return, the display device may send an RTSP SETUP message 414 to UE 204, which contains new session parameters to be employed in communications between UE 204 and the display device 206. The UE may send a confirmation message RTSP 200 OK message 416 to display device 206 in response. Subsequently, the communications between UE 204 and display device 206 may be adjusted according to the new session parameters set in RTSP SETUP message 414.

In additional embodiments, a UE may adjust communications over a local links, including a local P2P link, in accordance with further requirements specified by a network operator. For example, the communications over link 208 may be adjusted during a calling session from calling party 202 based upon operator defined Open Mobile Alliance (OMA) device management (DM) management objects (MO), which may impose a specific set of requirements for SIP/SDP session management for a UE operating over local links during a video communications session.

In addition to establishing, modifying, and/or terminating conversational multimedia sessions, additional embodiments may employ local UE connectivity information as part of media adaptation, buffer management, and/or QoE reporting.

For example, referring to FIG. 2, the a video adaptation module 114 of UE 204 may provide local link information to the operator(s) 210, 212 and/or the calling device 202, leading the media adaptation functions including bit-rate, packet-rate and/or error resilience adaptations to be performed by taking into account the characteristics of link 208 and the device capabilities of display device 206. In some embodiments, real-time transport control protocol (RTCP) receiver reports and/or Temporary Maximum Media Stream Bit Rate Request (TMMBR) messages may be generated from the display device 206 and provided by UE 204 to the operator(s) 210, 212 and/or the calling device 202. RTCP provides out-of-band statistics and control information for an RTP flow. The RTCP receiver report is a report that is used to inform a sender about the quality of service. A receiver may use the TMMBR to request a sender to limit the maximum bit rate for a media stream to a value corresponding to a provided value. Accordingly, in some embodiments, RTCP and/or TMMBR information may be used to influence video adaptations at the source end (calling device 202) in order to ensure reliable end-to-end video delivery and a high QoE.

In various other embodiments, a UE, such as UE 204, may receive a QoE trigger message from a network that is handling a streaming video session being received by the UE. The QoE trigger message may be conducted via SIP/SDP signaling or via OMA DM MO messages, and may request QoE metric measurement and reporting from the UE during the video streaming session. In response, the UE may generate QoE report(s) concerning the factors such as the quality of reception. The QoE reports may be based on QoE information collected by the UE from one or more of its local connections. In some embodiments, the UE 204 may return a QoE report that accounts for the reliability of transmissions over the link 208, as well as other factors, such as media buffering, decoding and other media processing that take place in devices coupled to UE 204 over the link 208. In one example the coupled devices may include a wireless adapter (not explicitly shown in FIG. 2), such as an adapter for Intel® Wireless Display (WiDi), which facilitates transferring video content between a UE device, such as a notebook screen and a television-type display.

In various embodiments of video communications over 3GPP networks, the QoE metrics returned by the UE 204 may include one or more metrics as defined in section 16.2 of TS 26.114. These metrics include corruption duration, successive loss of RTP packets, frame rate, jitter duration, sync loss duration, roundtrip time, average codec bitrate and codec information.

Figure 5:
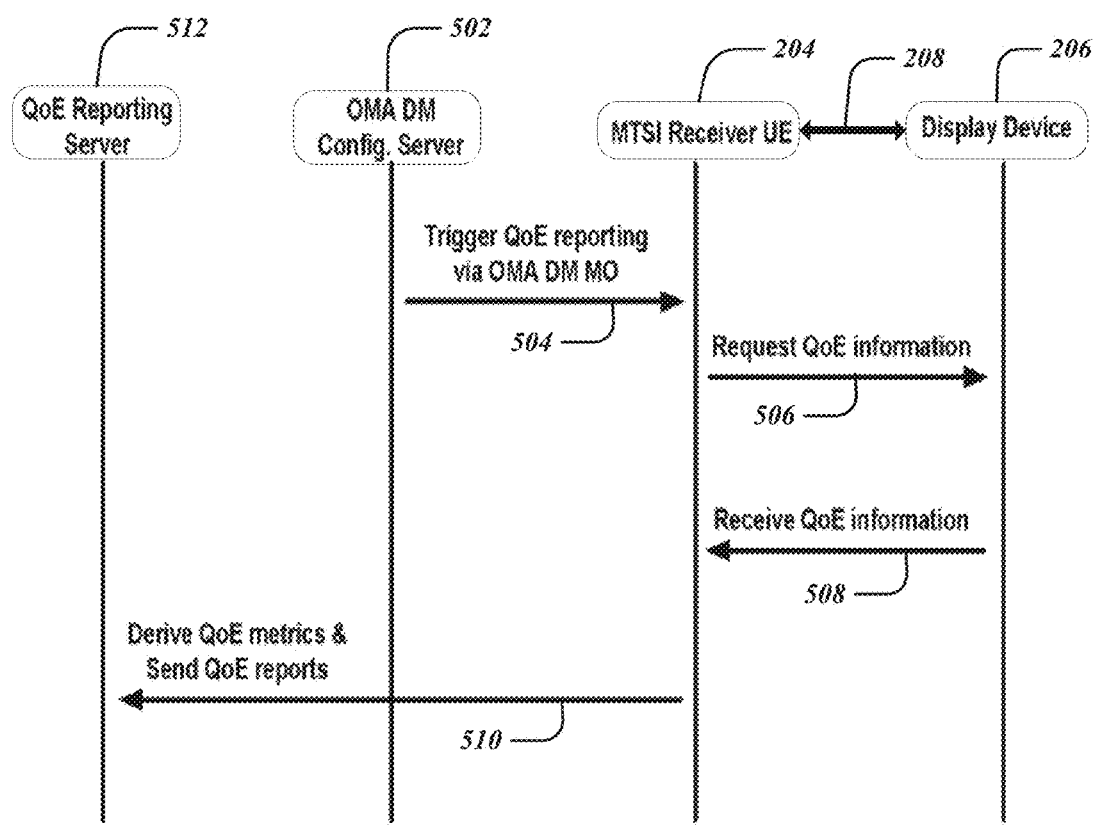
FIG. 5 depicts an embodiment of QoE reporting mechanism performed by an MTSI client.

FIG. 5 depicts an embodiment of QoE reporting mechanism performed by an MTSI client (UE 204) based on communications coordination over a local P2P link (link 208). In the scenario depicted in FIG. 5, a server, such as an OMA DM configuration server 502, sends a QoE trigger message 504 to trigger QoE reporting via OMA DM MO. The QOE trigger message 504 is received by the UE 204, which, in response, sends a QOE request message 506 to the display device 206. The display device 206, in turn, transmits QoE information in a QoE information return message 508, which is received by UE 204. The UE 204 subsequently uses the QoE information in the QoE information return message to derive QoE metrics. In some embodiments, a video adaptation module 114 may calculate metrics including one or more of: corruption duration, successive loss of RTP packets, frame rate, jitter duration, sync loss duration, roundtrip time, average codec bitrate and codec information.

After deriving the QoE metrics, the UE 204 may transmit the QoE report(s) based upon the derived metrics, which may be received by a QoE reporting server of a network hosting a current video streaming session, such as a internet telephony call.

In various other embodiments, connectivity information of a UE connected to multiple display devices over local links, may be used to establish, modify, and/or terminate streaming multimedia sessions when RTSP is used as the application-layer protocol.

In some embodiments for establishing an RTSP session, during capability negotiations with a PSS server for PSS services via the SDP, a PSS client (UE) that is connected locally over a local link to a peripheral display device may exchange information regarding device capabilities of local devices to which the UE is coupled over the local link, such as a P2P link. Such information may include, for example, TV screen capabilities in the case where a local display device includes a television. Other display device attributes of interest during device capability signaling from the UE may include the following parameters: Pre-decoder buffer size, initial buffering period, decoder capability, display properties (screen size, resolution, bit depth, etc.), streaming method (RTSP, HTTP, etc.) adaptation support, QoE support, extended RTCP reporting support, fast content switching support, as well as supported RTP profiles and SDP attributes.

In additional embodiments, as part of an RTSP/SDP-based session management for PSS, further information may be exchanged between the UE and PSS server. Such exchanged information may include, for example, information regarding codecs, container formats, decoder capabilities, QoS parameters (e.g., guaranteed bitrate) and transport protocols, where the exchanged information accounts for the characteristics of local P2P links (e.g., in terms of channel quality, capacity, throughput, etc.) and the capabilities of the corresponding devices linked to the UE over the local P2P links, e.g., screen size, resolution, bit depth, etc, In some embodiments, the UE may gather such information from its local P2P links using RTSP signaling and provide this information to the PSS server. The UE may further manage the streaming multimedia session, may modify session parameters (e.g., derive new RTSP/SDP session parameters), and may perform further tasks affecting the local P2P link(s). Such further tasks may include prioritizing traffic, allocating resources and/or optimizing bandwidth/quality of service (QoS) for the local P2P link(s) based upon multimedia information gathered from session-level signaling over a network linking the PSS server to the PSS client, such as a 3GPP network. Examples of the multimedia information include codec information, quality requirements, and rate-distortion characteristics.

Figure 6:
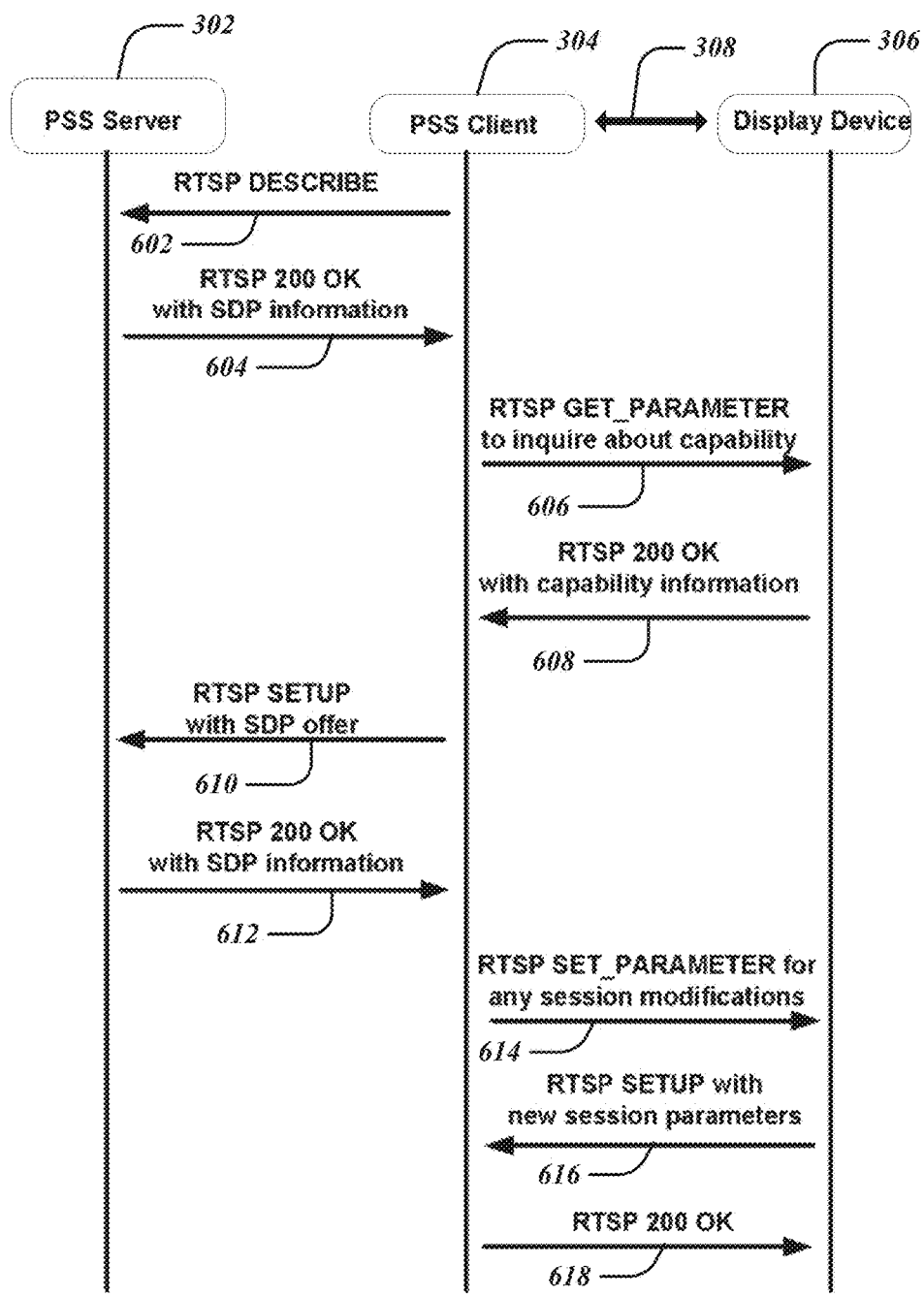
FIG. 6 depicts an embodiment of RTSP/SDP-based device capability signaling and session parameter negotiation operations of a UE terminal in a packet-switched streaming (PSS) system.

FIG. 6 depicts an embodiment of RTSP/SDP-based session management in which support for RTSP-based streaming protocol occurs over a local P2P link. As illustrated, a UE (PSS Client) 304 may initiate an RTSP session by sending an RTSP DESCRIBE message 602 over a network to a PSS server 302. The DESCRIBE message 602 may include an RTSP URL and the type of reply data that can be handled. In return, the PSS server 302 may send an RTSP OK 200 message 604, which includes SDP information that acts as a trigger message for UE 304 to perform one or more actions. Upon receipt of the RTSP OK 200 message 604, the UE 304 may send an RTSP_GET PARAMETER message 606 to the display device 306. In return, the display device 306 may send an RTSP OK 200 message 608 to UE 304 that includes capability information of the display device 306. This may cause the UE 304 to send an RTSP SETUP with SDP offer message 610 to the PSS server 302. The PSS server 302 may subsequently send a RTSP 200 OK message 612 that includes SDP information to be used in the PSS session. The SDP information may be based at least in part upon the capability information provided by the display device 306. In various embodiments, when the UE receives the SDP information from PSS server, the PSS session may be managed according to the received SDP information.

In some embodiments, as further depicted in FIG. 6, the UE may subsequently forward an RTSP SET_PARAMETER message 614 to the display device 306. The RTSP SET_PARAMETER message 614 may be based upon the SDP information received in the RTSP OK message 612. After receiving the RTSP SET_PARAMETER message 614, the display device 306 may subsequently provide new proposed session parameters to the UE 204 via an RTSP SETUP message 616. The UE 304 may then send a reply to the display device 306 via an RTSP 200 OK message 618, after which the new proposed session parameters are adopted for the communications session.

In additional embodiments, a UE may adjust communications over local links, including a local P2P link, in accordance with further requirements specified by a network operator. For example, the communications over link 308 may be adjusted during a streaming session based upon operator defined Open Mobile Alliance (OMA) device management (DM) management objects, which may impose a specific set of requirements for RTSP/SDP session management for a UE operating over local links, during a multimedia streaming session.

In various additional embodiments, local connectivity information pertaining to a given UE may be employed as part of the media adaptation, buffer management, and/or QoE reporting mechanisms during a multimedia streaming session. In particular, in some embodiments, media adaptation functions including bit-rate adaptations may be performed by accounting for the characteristics of local P2P link(s) to a UE and corresponding device capabilities of display devices coupled to the UE via the local P2P links. Consequently, RTCP Receiver Reports or RTSP messages (e.g., RTSP SETUP or SET_PARAMETER) from the receiver (UE) may be generated to influence video adaptations at the source end (PSS server), so that reliable end-to-end video delivery and high QoE may be ensured.

In other embodiments, QoE metric measurement and reporting may be triggered via RTSP/SDP signaling. For example, turning again to FIG. 6, QoE metric reporting rules may be signaled as part of the SDP negotiation process generally depicted in messages 610 and 612. In further embodiments, the QoE metric measurement and reporting may be triggered via OMA DM MO messages sent to a PSS UE, as generally illustrated at messages 504, 506 of FIG. 5.

Upon triggering of QoE metric measurement and reporting, a UE may generate QoE reports that indicate the quality of reception. In particular, the QoE reports may be based on the QoE information collected by the PSS UE from its local links to the display devices, and may take into account such factors as the reliability of transmissions over a local P2P link(s), as well as media buffering, decoding and other media processing involved in devices linked to the UE over the P2P link(s) (e.g., WiDi adapter in the case of the WiDi application). In various embodiments, the QoE Metrics for RTSP-based streaming may include one or more of: corruption duration, successive loss of RTP packets, frame-rate deviation, jitter duration, content switch time, initial buffering duration, rebuffering duration, average codec bitrate, codec information and buffer status, as defined in 3GPP TS 26.234, Release 10.

In various other embodiments, information regarding local links to a UE together with a media presentation description (MPD) meta data file may be used to manage dynamic adaptive HTTP streaming (or "DASH")-based multimedia sessions. The MPD provides sufficient information for a DASH client for adaptive streaming of media content by downloading media segments from a HTTP server. In DASH, the MPD can be fragmented and delivered in parts to reduce the session start-up delay. The MPD can be also updated during the streaming session. In some embodiments, as part of streaming decisions made at the DASH client (UE), such as which multimedia representations to request from the HTTP server (based on an MPD fetched at the beginning of the DASH session describing the structure and different versions of the media content stored in the server including different bitrates, frame rates, resolutions, codec types, etc.), further information may be utilized by the DASH client. This further information may include, for example, information related to codecs, container formats, decoder capabilities, QoS parameters (e.g., guaranteed bitrate) and/or transport protocols, in which the information accounts for the characteristics of a local P2P link(s), accounting for such factors as channel quality, capacity, throughput, etc., as well as the capabilities of the corresponding devices coupled to the UE over the local P2P links.

In some embodiments, the DASH client (UE) may gather such information from its local P2P links using RTSP signaling and provide this information to an HTTP or PSS server. The UE may further manage the streaming multimedia session, may modify session parameters (e.g., derive new RTSP/SDP session parameters), and may perform further tasks affecting the local P2P link(s). Such further tasks may include prioritizing traffic, allocating resources and/or optimizing bandwidth/quality of service (QoS) for the local P2P link(s) based upon multimedia information gathered from session-level signaling over a network linking the HTTP server to the DASH client, such as a 3GPP network. Examples of the multimedia information, which may be based upon the MPD, include codec information, quality requirements, and rate-distortion characteristics.

Figure 7:
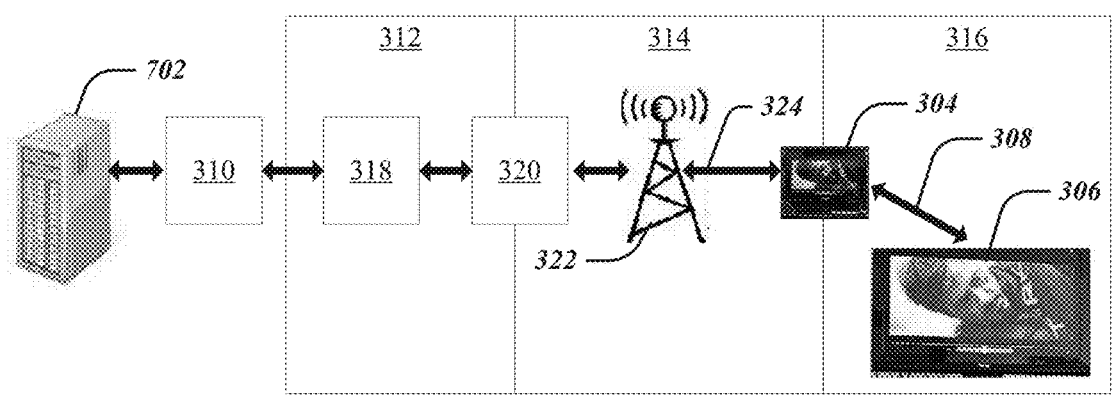
FIG. 7 depicts a system for multimedia streaming between a UE and an HTTP server consistent with further embodiments.

Consistent with further embodiments, FIG. 7 depicts a system 700 for multimedia streaming between a UE 304 and an HTTP server 702, which may act as a source of streaming video. The system 700 may be arranged similarly to system 300 described previously, with HTTP server 702 providing streaming content instead of the PSS server 302.

Figure 8:
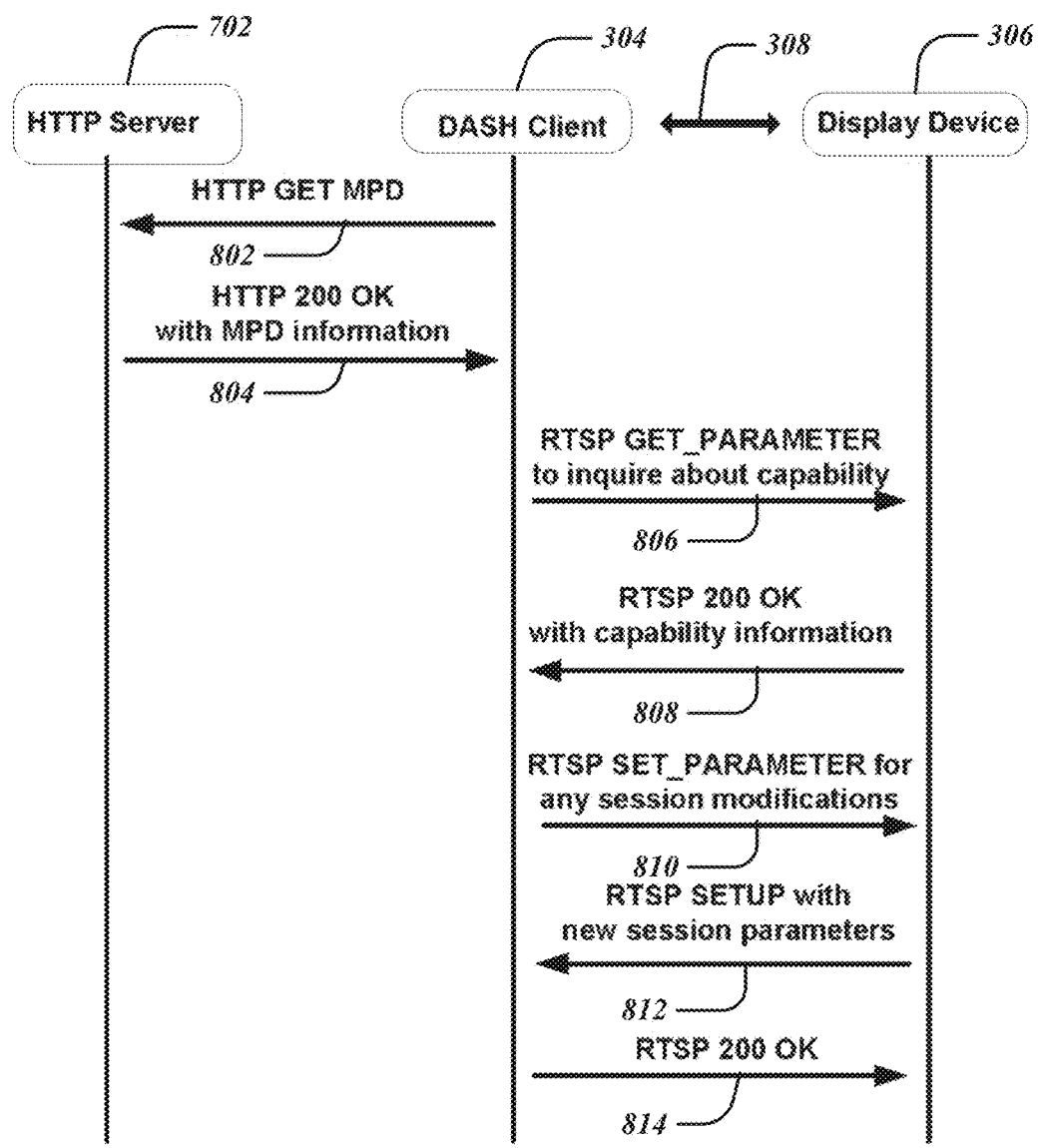
FIG. 8 depicts an embodiment of DASH-based session management signaling.

FIG. 8 depicts an example of DASH-based session management signaling in which the support for RTSP-based streaming protocol occurs over the local P2P link (as in an embodiment using a WiDi adapter). In FIG. 8, the UE 304 may act as a DASH client. When a user wishes to initiate a streaming session, the UE 304 is used to send an HTTP GET MPD message 802 the HTTP server 702. The HTTP server 702 may return to the UE 304 an HTTP 200 OK message 804 together with MPD information, which message acts as a trigger message for the UE to perform one or more actions. Subsequently, for example, the UE 304 may send an RTSP GET_PARAMETER message 806 to display device 306 to interrogate the display device regarding device capability. In response, the display device 306 may send to the UE 304 an RTSP 200 OK message 808 that contains capability information of the display device 306.

In further communications, the UE device 304 may send an RTSP SET_PARAMETER message 812 to the display device, which message may contain any session modifications to a current HTTP media streaming session. In return, the display device 306 may send an RTSP SETUP message 814 that includes new session parameters. Subsequently, the UE may send an RTSP 200 OK message 814 to the UE 304.

In other embodiments, during HTTP streaming session, information related to local UE links may be used as part of the media adaptation, buffer management and QoE reporting. In particular embodiments, media adaptation functions at a DASH client, including bit-rate adaptation, may be performed by accounting for the characteristics of local P2P link(s) between local device(s) and the DASH client, as well as corresponding device capabilities of the local device(s).

In still other embodiments, QoE metric measurement and reporting may be triggered via MPD signaling. In alternative embodiments, the QoE metric measurement and reporting may be triggered via OMA DM MO messages sent to a DASH client, as generally illustrated at messages 504, 506 of FIG. 5, where the DASH client may be represented by UE 204.

Upon triggering of QoE metric measurement and reporting, a UE may generate QoE reports that indicate the quality of reception. In particular, the QoE reports may be based on the QoE information collected by the DASH client from its local links, and may take into account such factors as the reliability of transmissions over a local P2P link(s), as well as media buffering, decoding and other media processing involved in display devices linked to the UE over the P2P link(s) (e.g., WiDi adapter in the case of the WiDi application). In various embodiments, the QoE Metrics for DASH-based streaming may include one or more of: HTTP Request/Response Transactions, Representation Switch Events, Average Throughput, Initial Playout Delay, Buffer Level, Play List, MPD Information, as defined in 3GPP TS 26.247, Release 10.

Although the present embodiments may be used to adapt communications such as video communications when a UE is simultaneously linked to a WWAN and a single local display device, various embodiments may be employed to adapt communications when multiple local links are active simultaneously, or in succession. In one use case consistent with the present embodiments, a user having a mobile terminal (UE) may wish to use the UE to view a game while at the same time as following broadcast news on mute. Both types of content may be downloaded from a 3GPP-based WWAN using the UE. The UE may then link to multiple peripheral (local) devices to enhance the viewing/listening experience. For example, the UE may be simultaneously connected to a TV (first local display device) and a tablet computer (second local display device) over two local links. In particular, the user may choose to watch the game on the TV, while viewing the news broadcast on the tablet computer. Consistent with the present embodiments, a video adaptation module running in the UE may optimize the delivery of both types of video content to the corresponding first and second local display devices. In one implementation, the video adaptation module in the UE may separately gather capability information for each connected local display device, in this case, the TV and tablet computer. The capability information for each local display device may then be signaled to the WWAN network and session parameters negotiated for each local display device. Moreover, after the session parameters are established, the UE may also manage the two different sessions over the respective two local links in order to optimize the video delivery to each local display device.

In additional embodiments, within a single session, the routing of content received by a UE over a first, non-local link, such as from a WWAN, may be switched between different local devices coupled to the UE over different local links. In one use case, a user that receives streaming video content for watching a game at the UE may wish to view the game on different local peripheral devices at different times. For example, the user may watch the first portion of a game on a TV, while moving to a different room to watch a second portion of the game using a tablet computer. The present embodiments facilitate optimizing the delivery of content to each peripheral local device, whichever is used at a given time. For example, the UE may perform a first set of signaling operations when the TV is used as the display device, and subsequently initiate a second set of signaling operations when the tablet computer is used as the display device. Moreover, the signaling operations may be switched multiple times depending on the currently selected device by the UE.

Included herein is a set of flow charts representative of exemplary methodologies for performing novel aspects of the disclosed system and architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
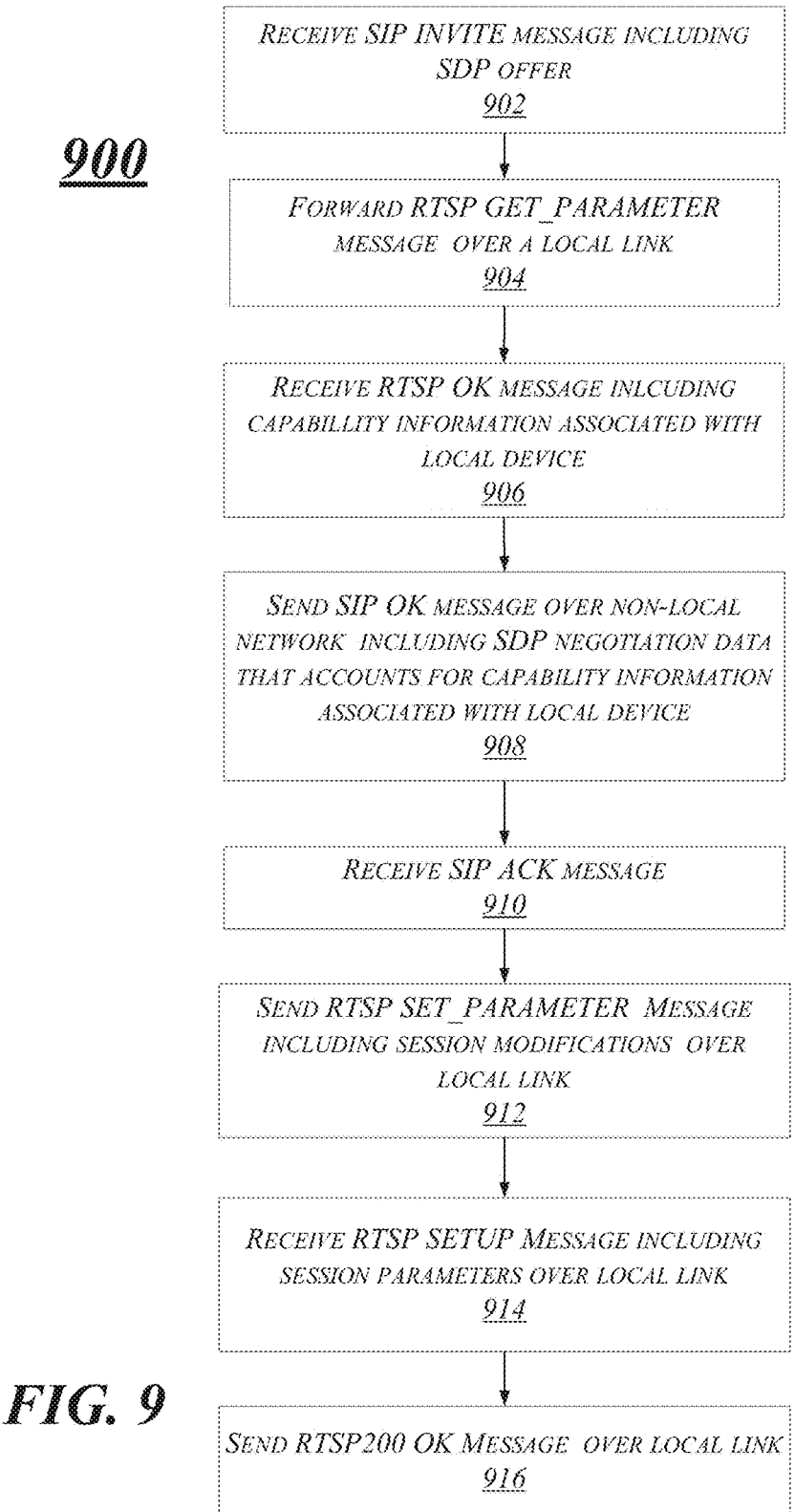
FIG. 9 depicts one exemplary logic flow.

FIG. 9 depicts one exemplary logic flow 900. At block 902, an SIP INVITE message is received, in which the SIP INVITE message includes an SDP offer. At block 904, an RTSP GET_PARAMETER message is forwarded over a local link to a local device, such as a display device. At block 906, an RTSP 200 OK message is received that includes capability information associated with the local device. At block 908, an SIP 200 OK message is sent over a network including SDP negotiation data, which may account for device capability information received in the RTSP 200 OK message. At block 910, an SIP ACK message is received. At block 912, an RTSP SET_PARAMETER message including session modifications is sent over a local link to the local display device. At block 914, an RTSP SETUP message is received including new session parameters. At block 916, if the new session parameters are acceptable, an RTSP 200 OK message is sent over the local link.

Figure 10:
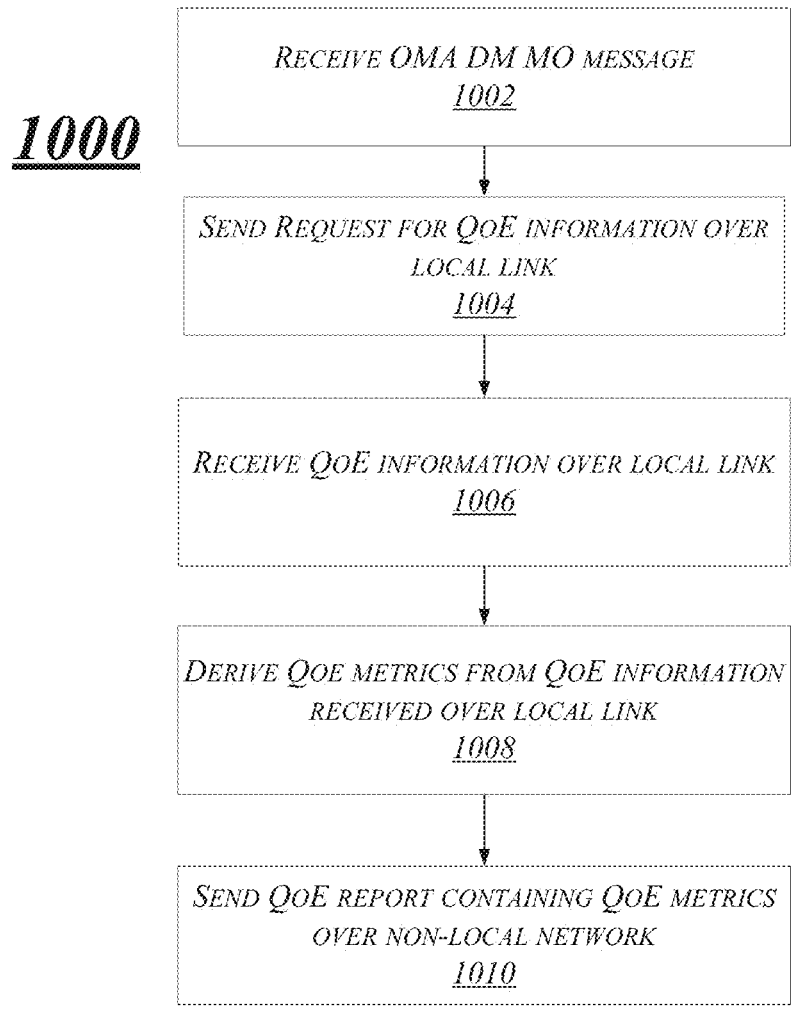
FIG. 10 depicts another exemplary logic flow.

FIG. 10 depicts one exemplary logic flow 1000. At block 1002, an OMA DM MO message is received. At block 1004, a request for QoE information is sent over a local link. At block 1006, QoE information is received over the local link. At block 1008, QoE metrics are derived from the QoE information received over the local link. At block 1010, a QoE report is sent over a non-local network containing the QoE metrics.

Figure 11:
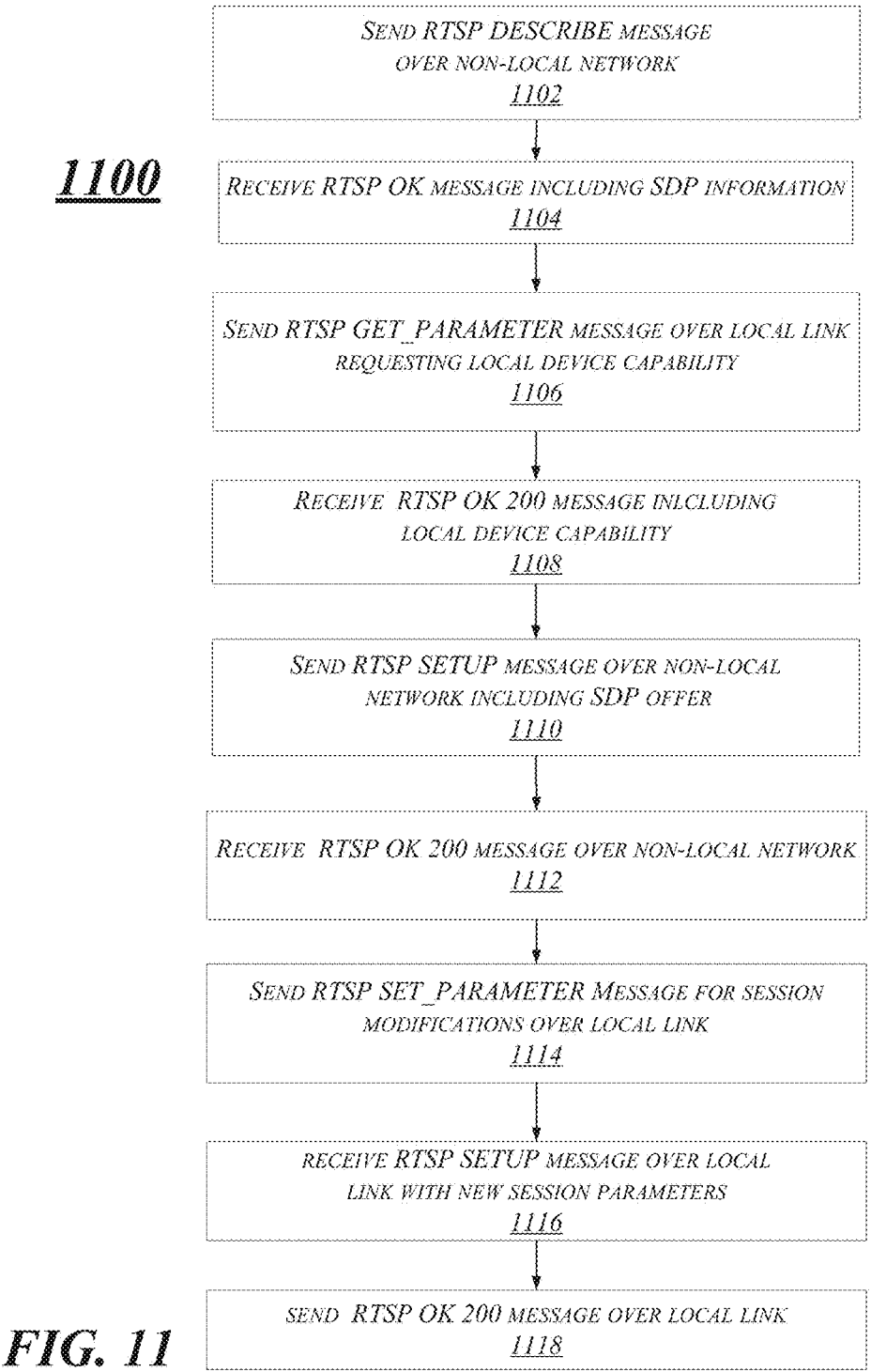
FIG. 11 depicts a further exemplary logic flow.

FIG. 11 depicts another exemplary logic flow 1100. At block 1102, an RTSP describe message is sent over a non-local network. At block 1104, an RTSP 200 OK message is received with SDP information. At block 1106, an RTSP GET_PARAMETER message is sent over a local link requesting local device capability information. At block 1108 RTSP OK 200 message is received that includes the local device capability information. At block 1110, an RTSP SETUP message is sent over the non-local network including an SDP offer. At block 1122 an RTSP 200 OK message is received over the non-local network. At block 1114 a RTSP SET_PARAMETER is sent for session modifications over a local link. At block 1116, an RTSP SETUP message 616 is received over the local link with new session parameters. At block 1118, an RTSP 200 OK message is sent over the local link.

Figure 12:
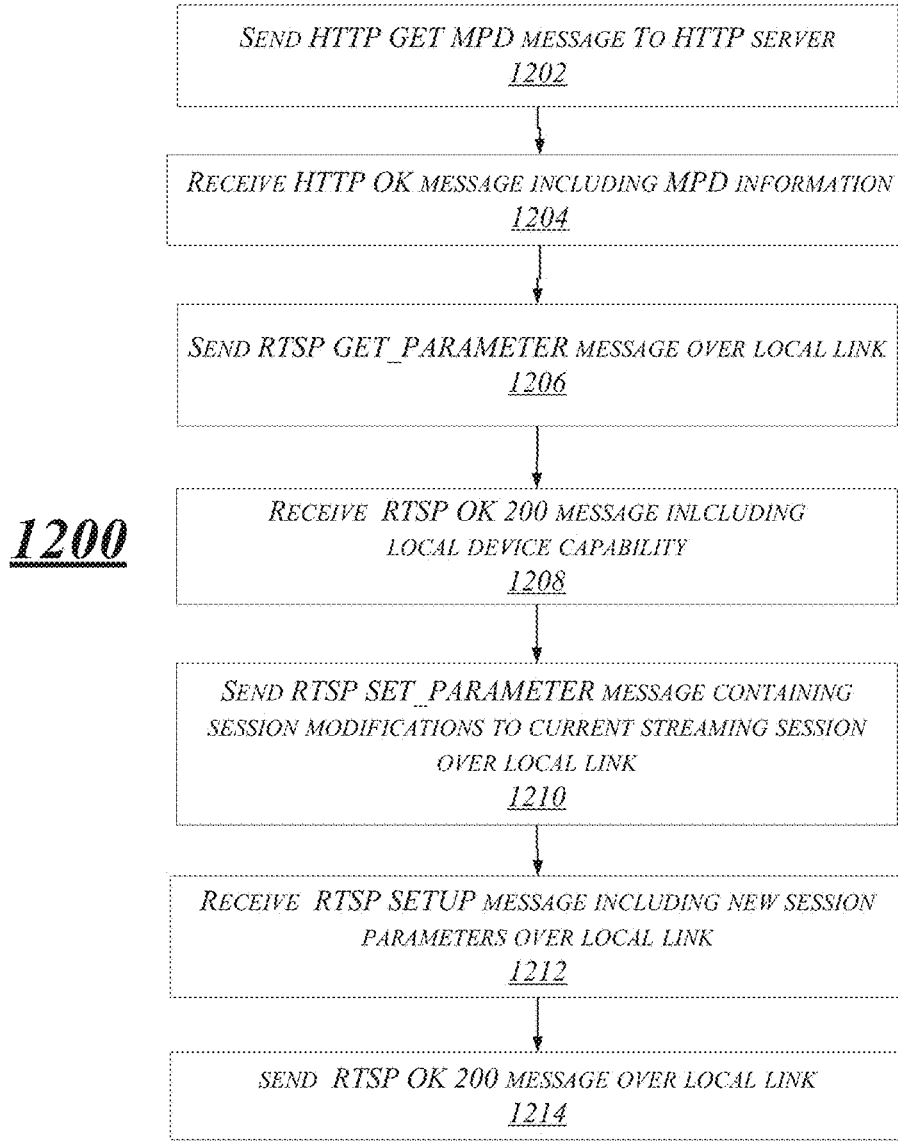
FIG. 12 depicts another exemplary logic flow.

FIG. 12 depicts another exemplary logic flow 1200. At block 1202, an HTTP GET MPD message 802 is sent to an HTTP server. At block 1204, an HTTP 200 OK message is received together with MPD information. At block 1206, an RTSP GET_PARAMETER message is sent over a local link. At block 1208, an RTSP 200 OK message that contains capability information of a local device is received. At block 1210, an RTSP SET_PARAMETER message containing session modifications to a current HTTP media streaming session is sent over the local link. At block 1212, an RTSP SETUP message that includes new session parameters is received over the local link. At block 1214 an RTSP 200 OK message is sent over the local link.

Figure 13:
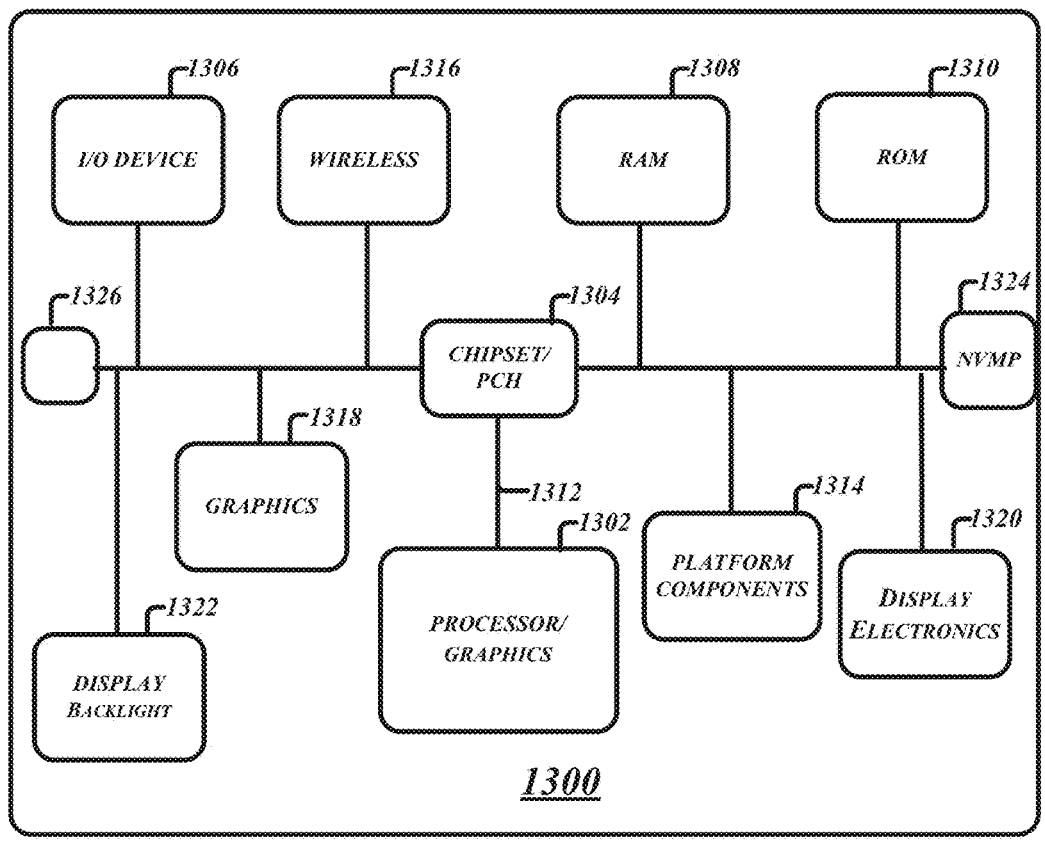
FIG. 13 depicts an embodiment of a computing system.

FIG. 13 is a diagram of an exemplary system embodiment and in particular, FIG. 13 is a diagram showing a platform 1300, which may include various elements. For instance, FIG. 13 shows that platform (system) 1310 may include a processor/graphics core 1302, a chipset/platform control hub (PCH) 1304, an input/output (I/O) device 1306, a random access memory (RAM) (such as dynamic RAM (DRAM)) 1308, and a read only memory (ROM) 1310, display electronics 1320, display backlight 1322, and various other platform components 1314 (e.g., a fan, a crossflow blower, a heat sink, DTM system, cooling system, housing, vents, and so forth). System 1300 may also include wireless communications chip 616 and graphics device 1318. The embodiments, however, are not limited to these elements.

As shown in FIG. 13, I/O device 1306, RAM 1308, and ROM 1310 are coupled to processor 1302 by way of chipset 1304. Chipset 1304 may be coupled to processor 1302 by a bus 1312. Accordingly, bus 1312 may include multiple lines.

Processor 1302 may be a central processing unit comprising one or more processor cores and may include any number of processors having any number of processor cores. The processor 1302 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1302 may be multiple separate processors located on separate integrated circuit chips. In some embodiments processor 1302 may be a processor having integrated graphics, while in other embodiments processor 1302 may be a graphics core or cores.

Figure 14:
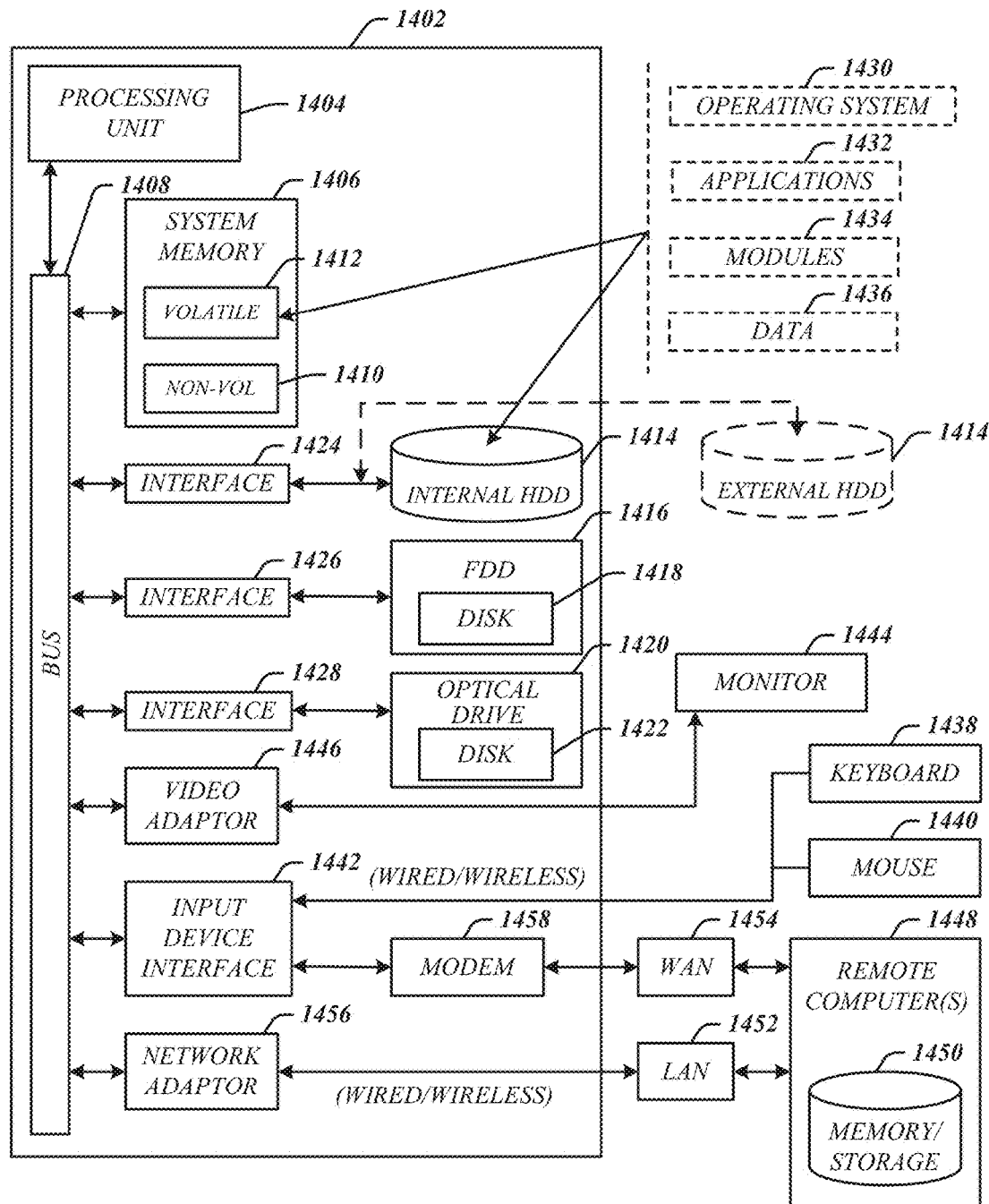
FIG. 14 illustrates one embodiment of a computing architecture.

FIG. 14 illustrates an embodiment of an exemplary computing system (architecture) 1400 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1400. For example, a component can be, but not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1400 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1400 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1400.

As shown in FIG. 14, the computing architecture 1400 comprises a processing unit 1404, a system memory 1406 and a system bus 1408. The processing unit 1404 can be any of various commercially available processors. Dual microprocessors and other multi processor architectures may also be employed as the processing unit 1404. The system bus 1408 provides an interface for system components including, but not limited to, the system memory 1406 to the processing unit 1404. The system bus 1408 can be any of several types of bus structure that may further interconnect to a memory bus (with or without a memory controller), a peripheral bus, and a local bus using any of a variety of commercially available bus architectures.

The computing architecture 1400 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 14, the system memory 1406 can include non-volatile memory 1410 and/or volatile memory 1412. A basic input/output system (BIOS) can be stored in the non-volatile memory 1410.

The computer 1402 may include various types of computer-readable storage media in the form of one or more lower speed memory units, including an internal hard disk drive (HDD) 1414, a magnetic floppy disk drive (FDD) 1416 to read from or write to a removable magnetic disk 1418, and an optical disk drive 1420 to read from or write to a removable optical disk 1422 (e.g., a CD-ROM or DVD). The HDD 1414, FDD 1416 and optical disk drive 1420 can be connected to the system bus 1408 by a HDD interface 1424, an FDD interface 1426 and an optical drive interface 1428, respectively. The HDD interface 1424 for external drive implementations can include at least one or both of Universal Serial Bus (USB) and IEEE 1294 interface technologies.

The drives and associated computer-readable media provide volatile and/or nonvolatile storage of data, data structures, computer-executable instructions, and so forth. For example, a number of program modules can be stored in the drives and memory units 1410, 1412, including an operating system 1430, one or more application programs 1432, other program modules 1434, and program data 1436.

A user can enter commands and information into the computer 1402 through one or more wire/wireless input devices, for example, a keyboard 1438 and a pointing device, such as a mouse 1440. Other input devices may include a microphone, an infra-red (IR) remote control, a joystick, a game pad, a stylus pen, touch screen, or the like. These and other input devices are often connected to the processing unit 1404 through an input device interface 1442 that is coupled to the system bus 1408, but can be connected by other interfaces such as a parallel port, IEEE 1294 serial port, a game port, a USB port, an IR interface, and so forth.

A monitor 1444 or other type of display device is also connected to the system bus 1408 via an interface, such as a video adaptor 1446. In addition to the monitor 1444, a computer typically includes other peripheral output devices, such as speakers, printers, and so forth.

The computer 1402 may operate in a networked environment using logical connections via wire and/or wireless communications to one or more remote computers, such as a remote computer 1448. The remote computer 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the LAN 1452 through a wire and/or wireless communication network interface or adaptor 1456. The adaptor 1456 can facilitate wire and/or wireless communications to the LAN 1452, which may also include a wireless access point disposed thereon for communicating with the wireless functionality of the adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, connects to the system bus 1408 via the input device interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. User Equipment (UE), comprising:
a packet based network interface to receive one or more media streams over a first link of a third generation partnership project (3GPP) network via a hypertext transfer protocol (HTTP) or a dynamic adaptive streaming over HTTP (DASH) protocol; and
a packet-switched streaming service (PSS) client to send capability information over the first link, the capability information to specify device capability attributes that describe device capabilities used to receive the one or more media streams over the first link, the device capability attributes to describe capabilities of a display device accessible via a second link of a wireless local area network, the PSS client to manage communication with the display device over the second link based upon information gathered from session level signaling with a PSS server using a session description protocol (SDP) or media presentation description (MPD).

2. The UE of claim 1, the packet based network interface to receive a media stream via a real time streaming protocol (RTSP).

3. The UE of claim 1, the PSS client to send capability information via a real time streaming protocol (RTSP) and a session description protocol (SDP).

4. The UE of claim 1, the capability information including one or more of a pre-decoder buffer size, initial buffering period, decoder capability, display properties, streaming method, adaptation support information, quality of experience (QoE) support information, extended real time transport control protocol (RTCP) reporting support, fast content switching support, supported real-time transport protocol (RTP) profile information, or session description protocol (SDP) attributes.

5. The UE of claim 1, the PSS client to send negotiate session parameters over the first link based upon the capabilities of the display device.

6. The UE of claim 5, the session parameters including one or more of codec information, container format, decoder capabilities, video quality requirements, quality of service (QoS) parameters, transport protocols that account for characteristics of the second link, or capabilities of the display device.

7. The UE of claim 1, comprising a radio-frequency (RF) transceiver to communicate information over the second link, the PSS client to receive attributes that describe the display device capabilities over the second link via the RF transceiver, and forward the one or more media streams over the second link via the RF transceiver.

8. The UE of claim 7, the PSS client to perform over the second link one or more of modify session parameters, adapt video parameters, prioritize traffic over the second link, allocate resources, and optimize bandwidth allocation.

9. The UE of claim 7, the PSS client to perform media adaptation operations based upon one or more of characteristics of the second link or capabilities of the display device.

10. The UE of claim 1, the device capability attributes each comprising an attribute name, a permissible value, and semantics of a defined vocabulary.

11. The UE of claim 1, comprising a touch screen display.

12. User Equipment (UE), comprising:
a processor circuit; and
a packet-switched streaming service (PSS) client for execution by the processor circuit to receive capability information for a media stream over a link of a third generation partnership project (3GPP) long term evolution (LTE) or LTE advance (LTE-A) network, the capability information to specify device capability attributes used to receive the media stream over the link, and perform temporary adjustments to the device capability attributes to describe capabilities of a display device, the PSS client to receive the media stream via a hypertext transfer protocol (HTTP) or a dynamic adaptive streaming over HTTP (DASH) protocol, and a radio-frequency (RF) transceiver to forward the one or more media streams to the display device over a second link of a wireless local area network, and the PSS client to manage communication with the display device over the second link based upon information gathered from session level signaling with a PSS server using a session description protocol (SDP) or media presentation description (MPD).

13. The UE of claim 12, the PSS client to receive a second media stream via a real time streaming protocol (RTSP).

14. The UE of claim 12, the PSS client to derive, based upon characteristics of the second link and display device capability information, one or more of real-time transport control protocol (RTCP) receiver reports, real-time streaming protocol (RTSP) messages, temporary maximum media stream bit rate request (TMMBR) messages, or HTTP GET requests for DASH representations.

15. The UE of claim 12, the PSS client to generate a quality of quality of experience (QoE) report based on reliability of transmission over the second link or characteristics of media processing performed by the display device.

16. The UE of claim 15, the media processing to include media buffering operations or media decoding operations.

17. The UE of claim 12, the PSS client to perform using a real time streaming protocol (RTSP) and session description protocol (SDP) protocol stack over the second link session management or device capability signaling.

18. The UE of claim 12, comprising a touch screen display.

19. A wireless device, comprising:
a radio-frequency (RF) transceiver to receive one or more media streams from a packet-switched streaming service (PSS) server over a first link of a third generation partnership project (3GPP) long term evolution (LTE) or LTE advance (LTE-A) network via a hypertext transfer protocol (HTTP) or a dynamic adaptive streaming over HTTP (DASH) protocol;
a video adaptation module to cause capability information to be sent by the RF transceiver over the first link, the capability information to specify device capability attributes used to receive the one or more media streams over the first link, and perform temporary adjustments to the device capability attributes to describe capabilities of a display device accessible via a second link of a wireless local area network; and a radio-frequency (RF) transceiver to forward the one or more media streams to the display device over the second link of the wireless local area network, and the video adaptation module to manage communication with the display device over the second link based upon information gathered from session level signaling with the PSS server using a session description protocol (SDP) or media presentation description (MPD).

20. The wireless device of claim 19, the RF transceiver to receive a media stream via a real time streaming protocol (RTSP).

21. The wireless device of claim 19, the video adaptation module to use a session initiation protocol (SIP) and session description protocol (SDP) protocol stack to cause device capability signaling, negotiation of session parameters, or multimedia-related information exchange signaling.

22. The wireless device of claim 19, the video adaptation module to use a real time streaming protocol (RTSP) and session description protocol (SDP) protocol stack to cause device capability signaling, negotiation of session parameters, or multimedia-related information signaling.

23. The wireless device of claim 19, the video adaptation module to use an HTTP protocol stack and media presentation description (MPD) metadata to cause multimedia-related information signaling.

24. The wireless device of claim 19, comprising a touch screen display.

25. A method, comprising:
sending capability information over a first link of a third generation partnership project (3GPP) network, the capability information to specify device capability attributes of a display device accessible via a second link of a wireless local area network;
receiving a media stream over the first link based on the device capability attributes, via a hypertext transfer protocol (HTTP) or a dynamic adaptive streaming over HTTP (DASH) protocol; and
sending the media stream over the second link to the display device; and
managing communication with the display device over the second link based upon information gathered from session level signaling with a PSS server using a session description protocol (SDP) or media presentation description (MPD).

26. The method of claim 25, comprising sending the capability information via a real time streaming protocol (RTSP) and a session description protocol (SDP).

27. The method of claim 25, comprising receiving a second media stream via a real time streaming protocol (RTSP).

* * * * *